March 18, 1969     J. A. VOSS ET AL     3,433,225

HYGIENIC DEVICES AND METHODS OF MAKING THE SAME

Filed Dec. 22, 1965     Sheet 2 of 7

INVENTOR.
JOSEPH A. VOSS
BY    CARL W. JOHNSON

*Fraser & Bogucki*

ATTORNEYS

March 18, 1969    J. A. VOSS ET AL    3,433,225
HYGIENIC DEVICES AND METHODS OF MAKING THE SAME
Filed Dec. 22, 1965

INVENTOR.
JOSEPH A. VOSS
CARL W. JOHNSON
BY
ATTORNEYS

March 18, 1969  J. A. VOSS ET AL  3,433,225
HYGIENIC DEVICES AND METHODS OF MAKING THE SAME
Filed Dec. 22, 1965  Sheet 5 of 7

FIG. 16

INVENTOR.
JOSEPH A. VOSS
CARL W. JOHNSON
BY
*Fraser & Bogucki*
ATTORNEYS

United States Patent Office 3,433,225
Patented Mar. 18, 1969

3,433,225
HYGIENIC DEVICES AND METHODS OF MAKING THE SAME
Joseph A. Voss, 1223 Race St., Apt. 902, Denver, Colo. 80206, and Carl W. Johnson, Boulder, Colo.; said Johnson assignor to said Voss
Filed Dec. 22, 1965, Ser. No. 515,592
U.S. Cl. 128—263            17 Claims
Int. Cl. A61l *15/10*

ABSTRACT OF THE DISCLOSURE

An hygienic medium applicator tube, having a tapered, substantially closed forward end, is disclosed. The forward end of the tube comprises a plurality of shaped segments, the edges of adjacent segments being held in close approximation to provide the tapered configuration. The applicator is formed of a resilient material, such as a plastic or cellulosic material and the segments readily part during expulsion of the hygienic medium. In making the applicator tube, a plurality of shaped segments are formed in the forward end of a tubular member. The taper is formed by folding the segments inwardly and bringing the edges of adjacent segments into abutment along a substantial portion of the length of the edges.

---

The present invention generally relates to hygienic devices and more particularly relates to improved hygienic devices such as catamenial tampon devices, suppository devices and the like, and to improved methods of fabricating the same.

Various devices for catamenial and suppository purposes have been proposed for sanitarily injecting absorbent and medicinal media into appropriate body cavities. Such devices usually comprise the hygienic media, together with applicators or other means for delivery of the hygienic media. Most of such applicators are generally cylindrical in cross-section so as to generally conform to the cross-sectional configuration of the body cavities into which they are to be inserted. However, most of such devices are not well adapted for their intended purposes. In this regard, they usually employ applicators having open, blunt forward ends which do not facilitate their insertion into the body cavities nor do they afford adequate sanitary protection of the hygienic media disposed within the applicators. Body tissues defining body cavities such as the vagina and anus normally are in a collapsed condition. That is, the tissues approximate each other so that the opening to a given body cavity is very small. Those tissues are somewhat difficult to spread apart for inserting hygienic applicators. It will be appreciated that blunt open-ended and/or rough surfaced front portions of conventional hygienic applicators are difficult to insert and are likely to cause considerable irritation of the sensitive body tissues defining the cavities during such insertion. Usually, considerable force is required to accomplish such insertion.

With those conventional hygienic applicators which have closed front ends, a problem also arises relative to opening of the front end. Although the front end of such an applicator should open with a minimum amount of force during expulsion of a hygienic medium therefrom, so as to avoid damage to the medium and so as to maximize ease of use of the device, most hygienic devices of this type require a large amount of force to open and are clumsy to handle and use. Furthermore, many conventional hygienic devices are of complicated and expensive construction are not adapted to economical mass production.

Accordingly, it is a principal object of the present invention to provide improved hygienic devices and improved applicators for such devices.

It is also an object of the present invention to provide improved methods of making hygienic devices and applicators for such devices.

It is further an object of the present invention to provide an inexpensive method of making an improved hygienic applicator, which method is readily adapted to a wide variety of starting materials and mass production techniques, and which results in an applicator which combines ease of use with sanitary protection and improved customer acceptance.

It is still further an object of the present invention to provide a hygienic device incorporating an improved applicator, which applicator effectively protects a hygienic medium disposed therein, minimizing the force required to eject the medium therefrom and minimizing frictional resistance between the medium and applicator and between the applicator and body tissues during use of the applicator.

The foregoing and other objects are achieved by the present invention which comprises an improved hygienic device employing a hygienic medium and an improved applicator for ejecting the hygienic medium contained therein. The applicator includes a tubular member having a normally generally closed tapered front end comprising a plurality of independent, forwardly directed segments disposed essentially uniformly thereabout, each segment having a smooth, uninterrupted exterior surface so that the exterior surface of the front end is essentially smooth and continuous. The edges of adjacent segments are disposed in close approximation to each other and may abut over a substantial length thereof. Moreover, the segments are adapted to readily separate during ejection of a hygienic medium through said front end. The tapered front end of the tubular member is readily insertable into the vagina, anus or other body cavity without any discomfort, the smooth essentially continuous exterior surface facilitating the insertion. Since the segments separate very readily in a radial direction during expulsion of the hygienic medium from the front end, they offer minimal resistance to the passage of the medium therefrom. Even if the medium is irregularly shaped so that one portion bears more heavily upon one or more but less than all of the segments, the medium still can be easily ejected, since the segments are independent of one another and self-supporting and are capable of moving radially beyond the radius of the remainder of the tubular member. The applicator of the device also includes means for expelling the hygienic medium from the front end of the tubular member. Such means may include a second tubular member releasably disposed in telescoping relation within the outer tubular member rearward of the hygienic medium. The applicator is capable of being made economically on a mass production basis, employing plastic and/or cellulosic materials. In accordance with the present method, the front end of a tubular member is formed into the previously described normally generally closed tapered configuration comprising a plurality of independent, self-supporting segments readily movable radially during expulsion of a hygienic medium and uniformly disposed about the front end. The edges of the segments are in close approximation to each other. After the front end is formed, a hygienic medium is disposed therein, after which an injecting means for the medium, such as a second tubular member, is inserted in the first tubular member rearward of the hygienic medium.

As a specific example, the front end of a smooth surfaced polyethylene tube having an O.D. of .549 inch, I.D. of .529 inch and approximately 2³¹⁄₃₂ inches long was cut to form a serrated pattern of 5 equal triangular segments each approximately 7/16 inch long, with the bases of adjoining segments touching each other and with the apices directed toward the front. The segments were distributed uniformly around the entire periphery of the tube at the front end.

The tube was then placed on a mandrel within a female die and with the rear end of the tube exposed. The exposed rear end was tapped lightly with a hammer to roll the rear edge of the rear end of the tube outwardly and forwardly to form a finger grip of double wall thickness. The formed ring finger grip then was compressed in a separate die to strengthen it and stabilize it to a thickness of about 1/16 inch.

The front end of the tube then was inserted into a female die having a generally conical downwardly directed cavity after a male die of about mating configuration was placed in the front end of the tube. The front end of the tube was then forced into the female die to draw the segments into a configuration with the apices meeting at the midline of the front end and with the edges of adjacent segments substantially abutting. Accordingly, the front end was given a steeple-shaped configuration. That configuration was made permanent by heating the female die to above the softening point of the polyethylene but below its melting point, and by holding the front end of the tube in the die system for about 5 seconds. The female die was then chilled to 38° F. to set the configuration of the polyethylene. In an identical but optional subsequent step, the heating and chilling were repeated to remove any sharp edges from the segments.

The tube was then removed from the female die and the male die was extracted, after which a tampon having a tapered front end was inserted into the tube and slid into contact with the front end. A smaller smooth, hollow, cylindrical polyethylene tube having an O.D. of .526 inch, and I.D. of .506 inch, a length of 2 13/16 inches and a reduced diameter open front end was inserted into the outer tube up to the rear end of the tampon. A drawstring connected to the rear end of the tampon then was passed back through the inner tube and out the rear end thereof. The catamenial device thereupon was completed. When the tampon was expelled by pushing the inner tube forward relative to the outer tube, a minimum amount of force was required, the segments of the outer tube front end readily separating radially to facilitate the expulsion. The hygienic device was found to be simple, very economical to make by the described method and highly effective for its intended purposes.

Further advantages of the invention will be apparent from a study of the following detailed description and the accompanying drawings, of which.

Referring more particularly to the accompanying drawings, a first embodiment of a hygienic device 20 in accordance with the present invention is schematically illustrated in various views in FIGS. 1 to 5, inclusive, of the accompanying drawings.

Figure 1:
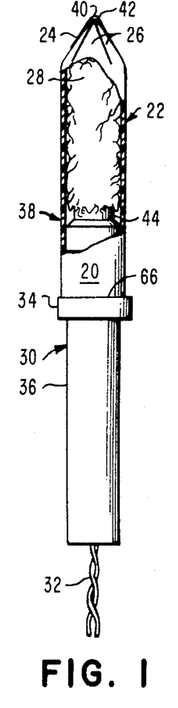
FIGURE 1 is a schematic side elevation of a first embodiment of the hygienic device of the invention, partly broken away to illustrate the internal construction thereof.
Figure 2:
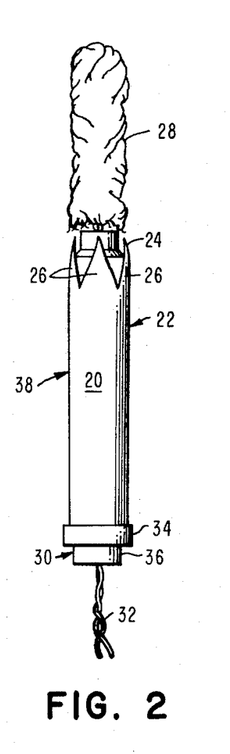
FIGURE 2 is a schematic side elevation of the device of FIG. 1 after explusion of a hygienic medium from the front end thereof.
Figure 3:
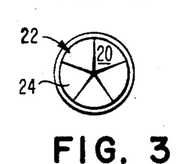
FIGURE 3 is a schematic front end view of the device of FIG. 1.

The device 20 comprises a hollow outer tube 22 which is preferably generally cylindrical in transverse cross-section and which includes a tapered front end 24 formed of a plurality, such as five, of forwardly extending, generally triangularly shaped independent, self-supporting segments 26 uniformly disposed about the front end 24. The device 20 also includes a hygienic medium, such as the tampon 28, and an ejecting means 30 releasably disposed in telescoping relation within the outer tube rearward of the tampon. The tampon hay have, as illustrated, a drawstring 32 connected to the rear end thereof, extending rearwardly through the rear end of the device 20, as shown in FIG. 1. The rear end of the tube 22 may be provided with a finger grip 34 of any suitable design to facilitate handling and use of the device 20. The ejecting means 30 may comprise any suitable means, such as a stick or the like, but preferably comprises, as shown in FIGS. 1 and 2, a hollow inner tube 36 of configuration and dimentions compatible with the configuration of the outer tube 22, e.g. generally cylindrical in cross-section. The outer surface of the inner tube 36 is in sliding engagement with the inner surface of the outer tube 22 so as to telescope easily therein to facilitate ejection of the hygienic medium 28 forwardly through the front end 24 of the outer tube 22 with a minimum amount of force, for example, 8 to 12 ounces. The outer tube 22 and the inner tube 36 together comprise the applicator 38 which is adapted to facilitate insertion of the tampon 28 or other hygienic medium into a body cavity such as the vagina.

The forward end 44 of the inner tube 36, if desired, may have a reduced diameter, as shown in FIGS. 1 and 2, to eliminate binding between the rear end of the tampon 28, the inner surface of the outer tube and the forward end 44.

It will be noted that in the embodiment illustrated in FIG. 1, the generally conical front end 24 of the outer tube 22 tapers to a tip 40. Depending upon the thickness of the individual segments 26, this tip 40 may be pointed or may be slightly frusto-conical. Moreover, as shown in FIG. 1, the tip 40 may be provided with a film of a sealant, such as a dried film of methyl cellulose, which aids in keeping the segments 26 in close approximation. The edges of the segments abut along at least a major portion of the length thereof and in the embodiment shown in FIG. 1 abut along substantially the entire length thereof. The film 42 is sufficiently thin so that the segments 26 readily separate in a radial direction, that is, open up, as shown in FIG. 2, when the tampon 28 is pushed through the front end 24 during expulsion thereof from the applicator 38 by the forward telescoping of the inner tube 36 relative to the outer tube 22.

Also, it will be noted that the segments 26 are independent and self-supporting and are not connected with one another except by the film 42 of sealant, so that during the described expulsion of the tampon 28, the segments 26 can easily move radially to permit the tampon 28 to escape from the front end 24 with a minimum of expelling force. Moreover, if the tampon 28 or other suitable hygienic medium is irregularly shaped or has been subjected to irregular radial compression so that it tends to expand irregularly from the front end 24, the individual segments can spread apart to a greater diameter than that of the remainder of the tube 22. Moreover, since the segments 26 are resilient, they move to about their normally-closed initial position after the tampon 28 is expelled and the inner tube 36 has been retracted to a position within the tube 22 out of contact with the front end 24. This, in turn, facilitates easy, painless withdrawal of the tube 22 from the vagina or other body cavity.

The outer tube 22 can be of suitable resilient material, such as paperboard, paper, a laminated product, including a plastic exterior and paper interior with or without a thin metallic foil inner surface, such as aluminum foil. Preferably, however, the outer tube comprises a plastic material, such as thermoplastic polyethylene, foamed polystyrene, polypropylene or the like. In any event, the outer tube is self-supporting, yet thin enough to impart the desired degree of flexibility to the individual segments 26 so as to allow them to separate readily during expulsion of the tampon 28 from the applicator 22. The inner tube 36 has a relatively smooth outer surface and can be constructed of any suitable material, cellulosic, plastic or the like, alone or in combination. Preferably, the inner tube 36 is constructed of material similar to that of the outer tube.

In one embodiment of the invention, a three-ply construction is employed for the outer tube, comprising a middle layer of kraft paper and thinner outer and inner layers of smooth polyethylene plastic film. The inner tube has a two-ply construction comprising an outer layer of polyethylene film and an inner layer of kraft paper. In another embodiment, the outer tube 22 and the inner tube 26 each comprise 1/32 inch thick molded foamed polystyrene. In still another embodiment, the outer tube 22 and inner tube 26 comprise polyethylene about .008–.011 inch thick (Grace density of .960). Any suitable thickness of material can be used for the tube 22 so long as the segments are sufficiently resilient and flexible, and the remainder of the tube is sufficiently rigid to facilitate its use.

In accordance with the present method, the front end 24 of the outer tube 22 is formed into the described steeple-shaped multi-segmented configuration, after which the inner tube 36 is inserted into the outer tube 22 to provide the finished applicator 38. Also, in accordance with the method, the tampon 28 can be inserted into the outer tube 22 before the inner tube 36 is inserted in the outer tube 22, so as to provide the finished device 20 of FIGS. 1 and 2.

The forming operation on the front end 24 of the outer tube 22 can be carried out in any suitable manner. For example, in one embodiment of the method, a straight piece of a hollow tube 46 is disposed on a mandrel 48 and the tubing 46 is held in fixed position by a pair of spaced positioner arms 50. A cylindrical cutter 52 supported on a shaft 54 and including a cutter blade 56 disposed on the outer surface thereof is rotated around the tube 46 in contact with the outer surface of the tube 46 so as to cut the desired serrated pattern of segments in the tube 46. By this means, two identical tubes 22 can be simultaneously cut from the single tube 46. It will be noted from FIGS. 1 to 5, incusive, that the segments 26 are uniformly disposed around the entire periphery at the front end 24 of each outer tube 22 and that each of the segments 26 has a generally triangularly shaped configuration with the apex of the triangle forwardly disposed. Adjoining segments 26 meet at the bases thereof and are otherwise free-standing from one another, self-supporting and independent. It will be understood that other suitable equipment can be used to cut the multi-segmented configuration into the front end 24 of each tube 22. Also, it will be understood that the blade 56 can be heated, if desired, in order to more readily cut through the tube 46 if the tube 46 comprises thermoplastic.

Figure 5:
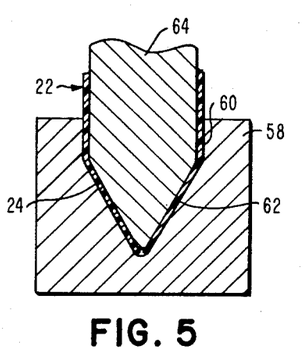
FIGURE 5 is an enlarged schematic cross-section of male and female die components during final forming of the front end of the device of FIG. 1.

Further in accordance with one embodiment of the method of the present invention, after the segments 26 have been formed in the tube 22, final forming is carried out to provide the desired tapered configuration in the front end 24. This can be achieved in any suitable manner, as through the use of one or a plurality of female-male die sets, such as the set illustrated schematically in cross-section in FIG. 5. Thus, for example, as shown in FIG. 5, a stainless steel female die 58 is provided which has a centrally disposed cavity 60 the lower portion 62 of which tapers downwardly in a generally conical or steeple-shaped configuration generally conforming to that desired for the front end 24. A male die 64 of mating configuration with the female die 58 is disposed within the front end 24 and is dimensioned so as to allow clearance for the front end 24 between the male die 64 and female die 58 when the front end is in the position shown in FIG. 5. During the final forming of the front end 24 of the outer tube 22, the front end 24 is forced into the female die 58 while the male die is maintained within the front end 24. The operation can be carried out automatically or by hand. In the event that a thermoplastic material is utilized for the front end 24 of the outer tube, the female die 58 and/or the male die 64 preferably is heated to a temperature above the softening point but below the melting point of the plastic for a sufficient period of time to fix the desired configuration of the front end after which the tube is allowed to cool or is chilled and then removed from the die system. As an example, the front end of a polyethylene plastic tube having a 5-segmented configuration of the described type and having an average wall thickness of about 0.011 was inserted into a stainless steel female die having a conical taper of about 30° and the die was maintained at a temperature of approximately 300° F. for 6 seconds while a mating stainless male die was kept in position in the front end of the tube. The female and male die then were chilled to 40° F. after which the polyethylene tube was removed and exhibited a steeple-shaped closed configuration, with the segments abutting but still independent. The melting point of polyethylene usually is between about 85° C. and about 110° C. and the temperature of the plastic itself should be maintained below that level. The contact time of the front end 24 in the heated die is regulated accordingly.

The described treatment of the thermoplastic front end 24 results in having the segments 26 assume the desired tapered configuration with the apices approximating each other at the midline of the front end and maintaining their positioning without necessitating the use of supplementary restraining means, such as glue, cold welding or the like, if the front end 24 is thermoplastic. However, the segments 26 still are sufficiently resilient to readily separate during expulsion of the tampon 28 from the front end 24.

If the front end 24 is thermoplastic, it can be subjected to an optional subsequent heating-chilling sequence in the manner just described and at above the softening point thereof, but below the melting point, to facilitate smoothing out of any rough edges on the segments 26.

If the front end 24 is fabricated of cellulosic material, usually it is desirable to coat the tip 40 with glue, methyl cellulose in ethyl alcohol or the like, to aid in maintaining the segments in close approximation. Thus, the glue, etc., can be applied by dropping on the surface of the tip 40, spraying on the tip, etc., while the segments 26 are maintained in the closed position, as by a restrainer ring or the like. The restrainer ring, etc., can be removed after the film 42 is set. The film 42 is sufficiently thin so as not to interfere materially with opening of the front end 24 during expulsion of the tampon 28 therefrom.

Preferably, a finger grip 34 is provided adjacent the rear end 66 of the outer tube 22. This can be accomplished in any suitable manner, as by application of a separately fabricated ring to the outer surface as by gluing, etc., in the manner more particularly described in U.S. Patent No. 3,347,234, issued Oct. 17, 1967 on copending U.S. patent application, Ser. No. 387,590, filed Aug. 5, 1964, entitled Hygienic Devices, of which Joseph A. Voss is the inventor, said patent being owned by the assignee of the present invention. Alternatively, the finger grip 34 can be provided by reflecting the rear end 66 of the outer tube 22 forwardly and outwardly upon itself to form a double thickness. The grip 34 then can be stabilized in a compression die or the like, as previously described herein. However formed, the finger grip 34 adjacent the rear end 66 of the tube 22 is preferred in order to facilitate handling and use of the applicator 38.

It will be understood that the inner tube 36 comprising the tampon-ejecting means 30 of the applicator 38 can be formed in any suitable manner. In the device 20 illustrated in FIGS. 1 and 2, the tube 36 is provided with a tapered front end 44 for the previously described purposes. One method of fabricating the tapered front end 44 is described in U.S. Patent No. 3,204,635, issued Sept. 7, 1965, entitled Hygienic Devices, of which the inventors are Joseph A. Voss and Carl W. Johnson and assigned to the assignee of the present invention. Other suitable methods are described more particularly hereinafter. Suitable means may be employed such as detents or the like (not shown) for releasably joining the inner tube 36 and outer tube 22 together in making the device 20.

After final forming of the outer tube 22, the hygienic medium (tampon 28) is disposed within the front end 24. The tampon 28 may be of any suitable configuration and size compatible with the outer tube 22, and usually is of compressed cellulosic material, such as cotton, rayon or the like. Preferably, the front end of the tampon 28 conforms to the configuration of the front end 24 of the outer tube 22, that is, is tapered, for ease of expulsion and insertion. It will be noted that the hygienic medium may comprise a vaginal or anal suppository or other suitable medium, if desired, in place of the tampon 28. Thereafter, the inner tube 36 is disposed within the outer tube 22 rearward of the hygienic medium to form the finally assembled device 20 as illustrated in FIG. 1.

The device 20, as shown in FIG. 2, readily opens at the front end 24 thereof during ejection of the hygienic medium by forward telescoping of the tube 36 therefrom. Accordingly, an improved device 20 incorporating an improved applicator 38 for insertion of suppositories, tampons and the like into body cavities is provided, the front end 24 of which facilitates ease of insertion of the applicator, delivery of the hygienic medium and withdrawal of the applicator.

Figure 9:
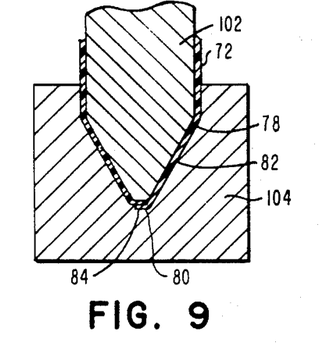
FIGURE 9 is an enlarged schematic cross-section of male and female die components, showing the front end of the device of FIG. 6 during a final forming operation.
Figure 10:
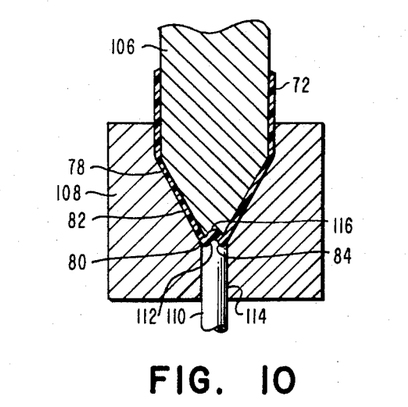
FIGURE 10 is an enlarged schematic cross-section of male and female die components, showing the front end of the device of FIG. 6 during a cold welding operation.
Figure 11:
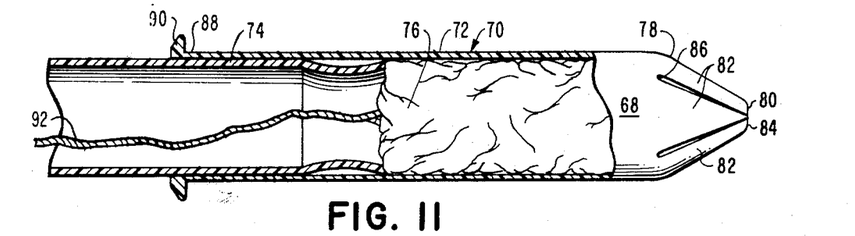
FIGURE 11 is an enlarged schematic side elevation of the device employing the outer tube of FIG. 6, portions being partly broken away to illustrate the internal construction and components thereof.
Figure 12:
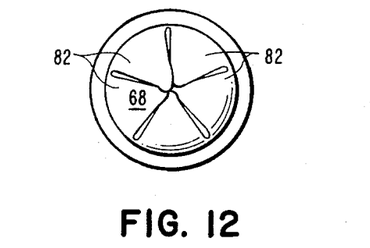
FIGURE 12 is an enlarged schematic front end view of the finished outer tube of FIG. 6 after final forming and cold welding.

A second embodiment of the improved device and applicator of the present invention is schematically illustrated in finished form in FIGS. 11 and 12 and during fabrication in FIGS. 6–10, inclusive. Thus, a hygienic device 68 is provided which includes, as in the device 20, an applicator 70 comprising an outer applicator tube and an inner applicator tube 74. The device also includes a hygienic medium such as a tampon 76. The tampon 76 is disposed within the outer tube 72 forward of the inner tube 74. The outer and inner tubes 72 and 74, respectively, and the tampon 76 can be fabricated of materials such as described for tubes 22 and 36, respectively, and tampon 28.

Figure 6:
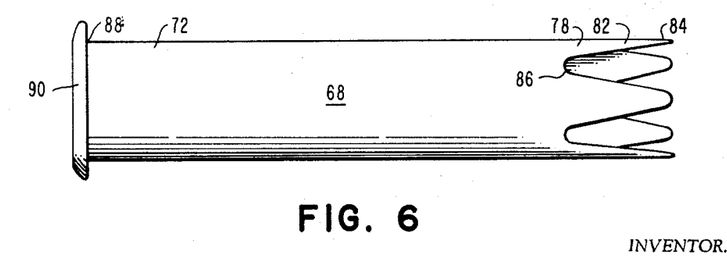
FIGURE 6 is an enlarged schematic side elevation of a second embodiment of the outer applicator tube of the hygienic device of the present invention.

The front end 78 of the outer tube 72 is constructed in a manner similar to that of the front end 24 of the outer tube 22, but the tip 80 thereof is flat and the segments 82 thereof at their apices 84 overlap one another, as shown in FIG. 9 and in FIG. 12, to provide the front end 78 with a frusto-conical configuration. It will be further noted that, as shown in FIG. 6, the segments 82 are generally triangularly shaped, but have rounded apices 84 rather than pointed apices, and the segments 82 are notched adjacent their bases 86, so as to reduce frictional resistance between the segments 82 and the tampon 76 during expulsion of the tampon 76 from the front end 78 and to facilitate separation of the segments 82 during such expulsion. As shown in FIG. 6, the segments 82 are, for example, five in number and are uniformly disposed around the periphery of the forward end in the manner previously described for the segments 26. It will be understood that any desired number of segments, such as 4, 6, 8, etc., can be provided in the device 68 in place of the five segments 82. The outer tube may be provided adjacent the rear end 88 with a finger grip 90, and the tampon 76 may be provided with drawstring 92, as shown in FIG. 11.

Figures 4, 8:
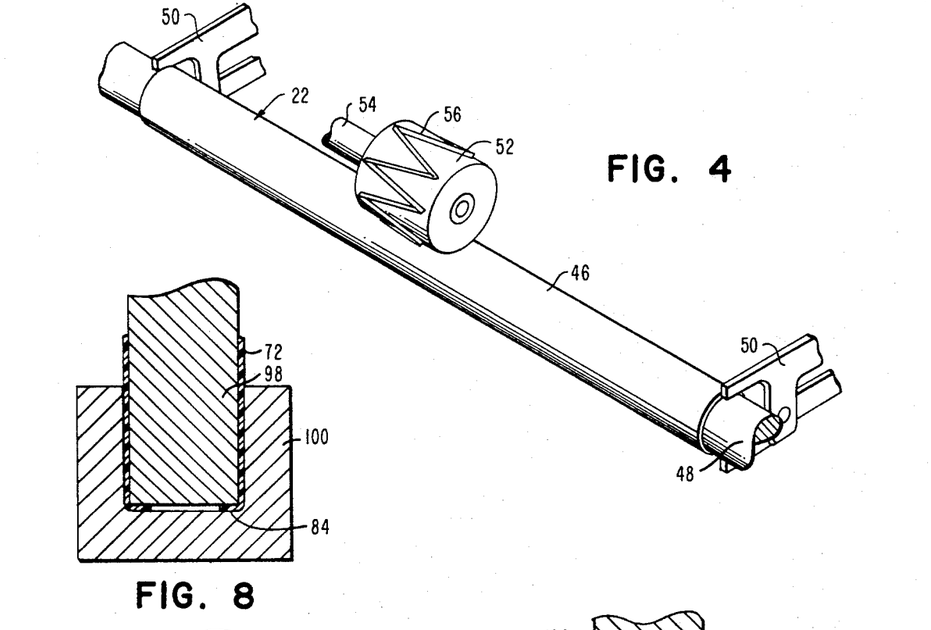
FIGURE 4 is a schematic perspective view of cutter means during fabrication of the device of FIG. 1 in accordance with the method of the present invention.
FIGURE 8 is an enlarged schematic cross-section of male and female die components, showing the front end of the device of FIG. 6 during a typical further tip bending operation.
Figure 7:
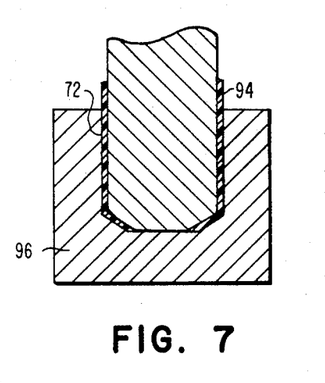
FIGURE 7 is an enlarged schematic cross-section of female and male die components, showing the front end of the tube of FIG. 6 during a tip bending operation.

In fabricating the device 68 in accordance with the present method, the segments 82 preferably are cut into the front end 78 of the tube 72 in a manner generally as previously described for the segments 26 of the tube 22 or in any other suitable manner. Final forming is then carried out. This can be accomplished by bending the apices 84 into the transverse plane of the tube 72 and forming the front end 78 into the frusto-conical configuration with the bent portions of the apices overlapping one another. The bending operation can be achieved in one or a plurality of sets of dies. As an example, as shown in FIGS. 7 and 8, the bending operation can be achieved in two successive sets of dies. In FIG. 7, a set of stainless steel dies comprising a male die 94 and a female die 96 partially bend at an angle of, for example, 60° from the vertical, each segment 82 towards the other segments 82. This can be accomplished by hand or automatically with or without the application of heat. As schematically shown in FIG. 8, a second set of dies comprising male die 98 and female die 100 is provided to accomplish in a similar manner the final bending of the segments 82 toward each other into the transverse plane, i.e. at a right angle to the remainder of each segment 82. If thermoplastic material is used for the front end 78, it is preferred that one or more heating-chilling cycles such as described in connection with the use of the dies 58 and 64 be employed. The front end is then brought into final configuration in a third set of stainless steel dies schematically shown in FIG. 9 comprising male die 102 and female die 104, with the bent apices 84 overlapping one another. Again, one or more heating-chilling cycles is preferred if the front end 78 is thermoplastic. Before insertion of the front end into the die set of FIG. 9, the bent apices can be coated on the exterior surface with a thin film of sealant, such as glue, etc. (not shown), if desired, to facilitate maintenance of the overlapping at the tip 80. Alternatively, if the front end of the tube 72 is thermoplastic material, the bent apices 84 can be cold welded, if desired, at the tip 80, as shown in FIG. 10, utilizing a male die 108 and a punch 110. The punch 110 may include a rounded small diameter leading surface 112 and access to the tip 80 may be provided via an aperture 114 in the die 108. The male die has a cavity 116 in the tip thereof matching the leading surface 112 of the punch 110. The punch is driven into contact with the bent apices 84 to deliver sufficient force to lightly cold weld the bent apices together and yet not puncture the same. The force required depends on the surface area of surface 112, the type of thermoplastic, its temperature, etc.

The front end 78 thereby is provided with its final frusto-conical configuration, with the tip 80 closed and with adjoining segments abutting along a major portion of the length thereof. Each of the segments 82 comprising the front end 78 has a smooth, essentially uninterrupted exterior surface, so that the exterior of the front end 78 is substantially smooth and continuous. Accordingly, in this respect the device 68 is similar to the device 20.

The finger grip 90 is provided in any suitable manner, as previously described in connection with device 20. In the embodiment shown in FIGS. 6, 11 and 12, the finger grip 90 is provided at the rear end 88 of tube 72 before final forming of the front end 78, by reflecting the rear end 88 forwardly and outwardly, as by the use of punches and dies, as previously described. The remaining components of the device 68, namely the tampon 76 and inner tube 74 or other ejecting means, can be assembled within the outer tube 72 in a manner as previously described in connection with similar components of the device 20.

The finished device 68, illustrated schematically in FIGS. 11 and 12, employs both the frusto-conical front-ended outer tube 72, the telescoping inner tube 74 and the hygienic medium, in this instance a tampon 76, disposed within the outer tube 72 forward of the inner tube 74. Such a device readily opens during expulsion of the tampon 76 from the front end 78. Moreover, the segments 82 tend to return to their approximate initial position after expulsion of the tampon 76, thereby readily facilitating withdrawal of the outer tube 72 from the body cavity after use.

As a specific example, five generally triangular segments 82 are cut into the front end 78 of a hollow cylindrical tube 72 comprising spirally wound smooth kraft paper having a laminated, smooth polyethylene film exterior surface. The tube is about 2.8 inches long, and the segments are each about .45 inch long with about a $\frac{1}{32}$ inch diameter gap between adjacent bases. Subsequently, $\frac{1}{32}$ inch of the apices 84 of the segments 82 are bent, coated with glue on the exterior surface and overlapped at about the midline of the front end 78 to form a $\frac{3}{32}$ inch diameter flat tip 80 and to provide the front end 78 with a 30° pitch, .40 inch length and frusto-conical configuration. The rear end 88 of the outer tube 72 is provided at the exterior surface with a $\frac{1}{32}$ inch thick, $\frac{1}{8}$ inch wide paperboard ring which is glued in place to form a finger grip 90. Such a ring could be, if desired, plastic, rubber or the like, adhesively bonded in place, or melted to seal it in place, etc.

The device 68 is also provided with a compressed cotton tampon 76 having a tapered front end disposed within the front end 78, and a cylindrical hollow inner tube 74 of thin, three layer laminated paper having a film of polyethylene on the outer surface and a tapered open front end and dimensioned to slidably engage the inner surface of the tube 72. The inner tube 74 is disposed rearward of the tampon 76, and a drawstring 92 passes rearwardly from the tampon 76 through the tube 74 and out the rear of the device. The segments 82 readily open to allow passage of the tampon 76 forwardly therefrom during use of the device.

Figure 1A:
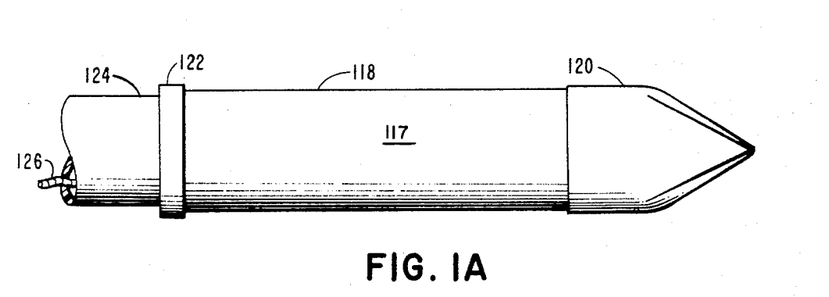
FIGURE 1a is an enlarged schematic side elevation of a modification of the embodiment of FIG. 1.

A modification of the device 20 is schematically shown in side elevation in FIG. 1a. The device 117 is substantially identical to the device 20, except that the outer applicator tube 118 thereof includes a forward end 120 which is a separate component from, but which is slipped over and is connected to, as by glue or the like, the remainder of the tube 118. Thus, the front end 120 can be fabricated in a manner such as previously described in connection with the first embodiment and then can be secured to the outer surface of the remainder of the tube 118 to provide the finished tube 118. The device 117 includes a finger grip 122, inner tube 124, drawstring 126 and tampon (not shown), illustrated schematically in FIG. 1a.

Figure 11A:
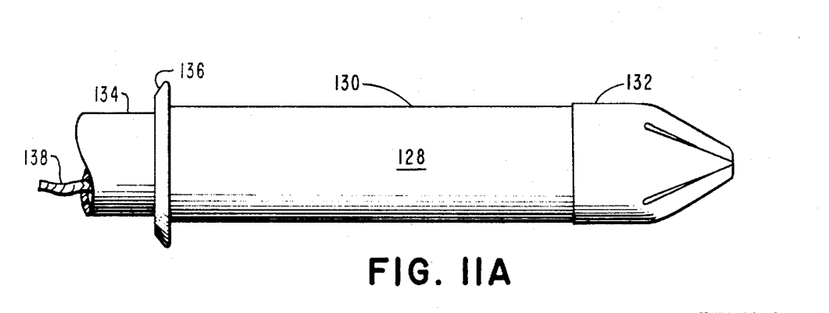
FIGURE 11a is an enlarged schematic side elevation of a modification of the embodiment of FIG. 11.

A similar procedure can be followed to provide the device 128 schematically illustrated in side elevation in FIG. 11a and having an outer tube 130 with a separate but connected front end 132. It will be noted that the front end 132 of the outer tube 130 is similar to the front end 78 of the device 68. The device 128 includes an inner tube 134, finger grip 136, drawstring 138, tampon (not shown), all similar to those previously described.

The manner of construction of the outer tubes of devices 117 and 128 has the advantage of permitting the front end of the outer tube to be fabricated separately and from a different material than that of the remainder of the outer tube. This is beneficial where particular properties are necessary for the front end of the outer tube and unnecessary elsewhere and where economy dictates such a procedure.

Figure 13:
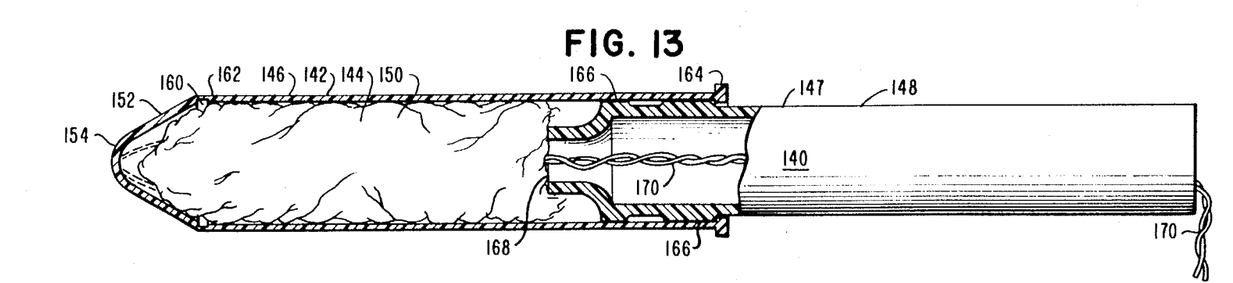
FIGURE 13 is an enlarged schematic side elevation of another hygienic device in accordance with the invention, portions being broken away to illustrate the internal construction thereof.
Figures 14, 15:
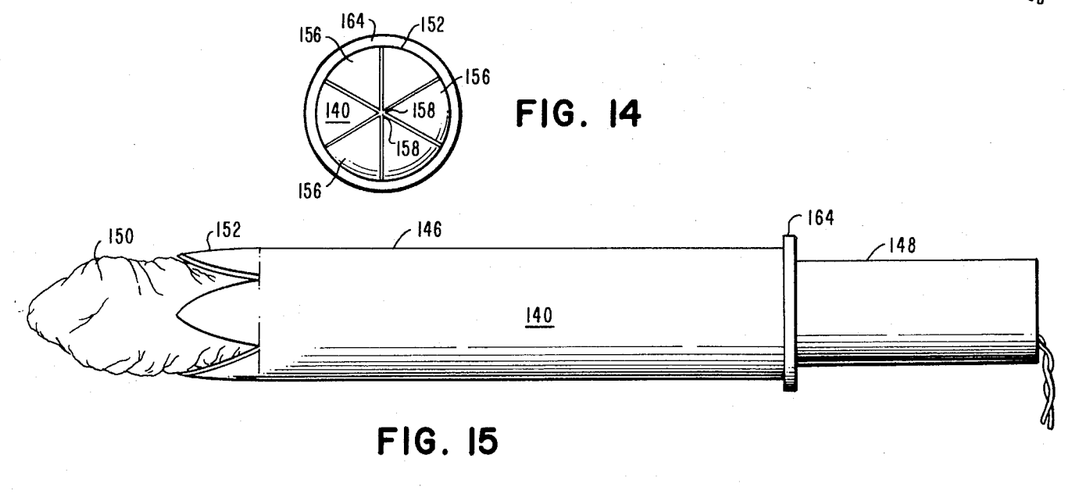
FIGURE 14 is an enlarged schematic front end view of the device of FIG. 13.
FIGURE 15 is an enlarged schematic side elevation of the device of FIG. 13 during explusion of a tampon therefrom.

FIGS. 13–15, inclusive, of the accompanying drawings schematically illustrate another hygienic device in accordance with the present invention. More particularly, FIG. 13 is a schematic side elevation of a hygienic device 140 with portions broken away to illustrate the internal construction thereof. The device 140 comprises a hygienic applicator 142 and a hygienic medium 144 disposed within the applicator 142. The applicator, in turn, comprises an outer tubular member 146 and a hygienic medium-ejecting means 147 comprising a second smaller tubular member 148 releasably disposed within the outer tubular member 146 of the hygienic medium 144, which may be, for example, a tampon 150, as illustrated.

The front end 152 of the outer tubular member 146 is tapered and multi-segmented and terminates in a dome-shaped nose 154. The whole exterior surface of the front end 152 is smooth and essentially continuous, and comprises a plurality of segments 145 each of which has a smooth, essentially uninterrupted exterior surface. The plurality of segments 156 are generally triangularly shaped, with the apices 158 thereof smoothly curved to form the nose 154. As shown more particularly in FIG. 14 in schematic end view, the apices 158 of the segments 156 closely approximately each other at the midline of the nose 154 and the edges of the segments 156 closely approximate each other throughout the length thereof. This feature materially contributes to the essentially continuous nature of the front end 152. The segments 156 are uniformly distributed around the whole front end 152 and are adapted to readily separate radially during expulsion of the hygienic medium 144 from said front end 152.

The outer tubular member 146 preferably also includes a circumferential groove 160 disposed in the transverse plane of the member 146, that is, in the interior or exterior surface thereof. This groove 160 is preferably disposed in the interior surface 162 of the member 146 at the rearward terminus of the front end 152 and serves to act as a hinge point for the segments 156 to facilitate the ease of their radial outward separation and also to make such separation more uniform during the decsribed expulsion. The outer tubular member 146 is also preferably provided with integral finger grip 164 which, as illustrated in FIG. 13, preferably extends both outwardly from the exterior surface and inwardly from the interior surface of the outer tube 146 at the rear end thereof. The finger grip 164 has the additional function of cooperating with the inner tubular member 148 to lock the same releasably in sliding engagement within the outer tubular member 146. In this regard, the inner tubular member 148 preferably is provided with one or a plurality of integral spacer rings 166 extending outwardly from the exterior surface thereof. The inwardly projecting portion of the finger grip 164 and the spacer rings 166 are dimensioned such that they releasably engage one another, as indicated in FIG. 13, to prevent inadvertent rearward withdrawal of the inner tube 148 from the outer tube 146. The spacer rings 166 also facilitate proper alignment and telescoping of the inner tube 148 in the outer tube 146 in sliding engagement therewith.

As shown schematically in FIG. 13, the inner tube may also include a front end 168 having a reduced diameter. The front end 168 is open to allow the passage of a drawstring 170 rearwardly therethrough from the rear end of the tampon 150 and out the rear end of the device 140. It will be understood that in the event that the device is used as a suppository applicator, the front end 168 of the inner tube 148 can be closed. The advantages of having a reduced diameter front end in the inner tube have been previously described. During expulsion of the tampon 150 from the front end 152 of the tube 146, the segments 156 readily separate from each other in a radial outward direction, as shown schematically in FIG. 15, and in a uniform manner, and are capable of separating to a diameter greater than that of the remainder of the tube 146.

The inner and outer tubes 146 and 148, respectively, and the tampon 150 can be fabricated from any suitable material such as that previously described in connection with the device 20 and the device 68. As one preferred embodiment of the device 140, however, the outer tube 146 is vacuum-formed foamed polystyrene sheet material, and so also is the inner tube 148. As a typical example of that embodiment, the outer tube 146 has an overall length of about 2⅞ inches, and outer diameter of about .625 inch, a wall thickness of about 1/32 inch, an angle of inclination in the front end rearward of the nose of about 30° and a finger grip 164 with a width of about 1/16 of an inch and extending interiorly of the inner surface of the outer tube about .008 inch. The grip 164 is melted, compressed and set foamed polystyrene. The tube 146 is provided with an internal groove 160 about 1/16 inch wide and about 0.010 inch deep in the inner surface at the rear terminus of the front end 152. The front end 152 comprises six smooth surfaced, generally triangular, uniformly spaced and configured segments separated by 0.010 inch wide slits. The front end 152 has a length slightly more than ⅜ inch. The outer tube 146 and the inner tube 148 are each vacuum-formed of foamed polystyrene sheet material in two halves which are joined together by water-soluble glue. Thereafter, the closed front end of the outer tube is cut into the described six uniform segments. Two, four, six, etc., segments could be used, if desired.

The inner tube 148 has an O.D. of 0.562 inch, exclusive of the two spacer rings 166 which extend from the exterior surface thereof about 0.016 inch. The forwardmost spacer ring has a width of ⅛ inch and the rearwardmost has a width of ¼ inch. They are spaced from one another by about 3/16 inch. The forward end 168 of the inner tube 148 is then reduced to an O.D. of ⅜ inch and is open. The inner tube has a nominal wall thickness of about 1/16 inch. The overall length of the inner tube is 3 1/32 inches, and the rearwardmost of the two spacer rings 166 terminates approximately 13/16 inch rearward of the front end 168 of the inner tube 148 so that when the inner tube 148 is disposed within the outer tube 146 with the finger grip 164 abutting the rearwardmost of the spacer rings 166, about a 2 inch space is left between the front end 168 of the inner tube 148 and the nose 154 of the outer tube 146 to accommodate the tampon 150.

It will be understood that the particular dimensions above-described can be readily changed to suit the particular use for the hygienic device 140. If the device 140 is used as a suppository applicator, normally the dimensions are reduced for both the inner and outer tubes 146 and 148 and the hygienic medium 144.

In accordance with one embodiment of the method of the present invention, the front end 152 of the outer tube 146 is initially formed into the desired final configuration shown in FIG. 13, except for being unsegmented. Segmentation of the front end 152 is thereafter carried out. The initial formation of the closed front end 152 of the outer tube 146 can be accomplished in a variety of manners. For example, the entire outer tube 146 can be cast, extruded, molded, vacuum formed, pressure formed or the like from a suitable thermoplastic material, such as polyethylene, polystyrene, polypropylene or the like. Alternatively, the tube 146, including the front end 152 and nose 154, can be similarly formed in a plurality of sections, such as halves, quarters, etc., which sections can then be joined together by any suitable menas, for example, through the use of a water-soluble glue, such as methyl cellulose in alcohol or by radio frequency welding, thermowelding or the like. Similar procedures can be employed to form the front end 152, by itself or after formation of the remainder of the outer tube 146. A portion or all of the closed front end with or without the remainder of the outer tube can also be formed from a suitable cellulosic such as wet-felting, suction molding or the like.

As a still further embodiment of the method of the present invention, the front end 152 can be formed in sections or in one piece but with the final segmented configuration, as by the use of suitable spacer elements in the molding or casting apparatus or the like. It will be understood that where it is stated that the front end of a tubular member is formed into the desired configuration, this includes the formation of the front end at the same time as the remainder of the tubular member or a portion of the remainder of the tubular member. A finger grip, such as grip 164, can be formed along with the remainder of the tubular member or a portion thereof or subsequently. The inner tubular member 148 can be formed in any suitable manner such as that described for the outer tubular member 146 but is preferably vacuum formed, preferably in sections. The spacer rings 166 can be incorporated into the member 148 after formation of that member, but preferably are integral and simultaneously formed with the remainder of the inner tubular member 148.

Figure 16:
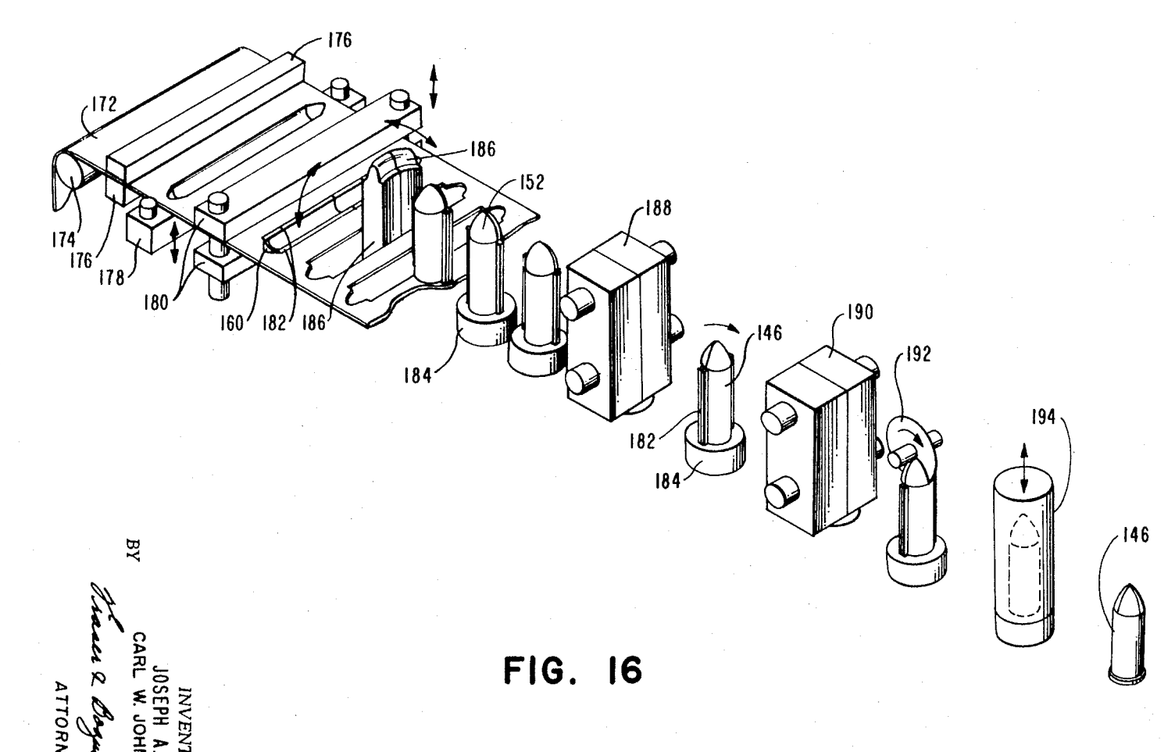
FIGURE 16 is a schematic perspective view of a processing sequence in the fabrication of the outer tube of the device of FIG. 13.

As a typical nonlimiting example of the method of the present invention for the formation of the front end 152 of the outer tubular member, particular reference is made to FIG. 16 wherein there is depicted schematically a typical processing sequence in the vacuum forming and assembly of the outer tube 146 of the device 140. As shown schematically in FIG. 16, a sheet 172 approximately 9 inches wide and comprising rigid, foamed polystyrene of an approximate thickness of about 0.050 inch is passed over a roller 174 and then between a pair of radiant infrared heating units 176, each spaced about 3 inches from the adjoining surface of the sheet 172 and operating at a temperature to heat the sheet to about 300° F. or other suitable temperature. The width of the radiant heating units 176 is coordinated with the rate of travel of the sheet 172 so as to cause the sheet to be heated to proper vacuum-forming temperature, characterized as the point at which the softened sheet exhibits its highest elasticity. In a typical sequence, the heating period of the sheet 172 between the units 176 is about 20 seconds.

The heated sheet 172 passes downstream to a point over a vacuum-forming unit 178 where vacuum-forming is effected over a 2–3 second interval, utilizing bottom suction afforded by a mechanical pump (not shown). It will be understood that mechanical assistance in vacuum-forming can also be employed, if desired, to reduce the vacuum-forming time. Such assistance can be afforded by one or a plurality of dies, punches, etc. (not shown). It will be further understood that although FIG. 16 shows only one outer tube being vacuum-formed at a time, in commercial production it would be preferable to vacuum-form a plurality of the outer tubes simultaneously, for example, 10–12 tubes 146.

As shown in FIG. 16, both halves of the outer tube 146 are simultaneously vacuum-formed end to end with the closed front end 152 and the groove 160 therein. The vacuum-formed sheet is then passed downstream between a pair of cutting dies 180. The dies 180 cut almost through the sheet 172 in a manner to almost completely free the two formed halves of the tube 146 from the sheet 172 and also split the two halves of the tube 146 transversely. The cutting operation is effected so as to leave a flange 182 on each side of the formed halves to aid in joining the halves together. The two formed and cut out halves of the tube 146 are then forced from the sheet 172 and into abutting relation around a vertically disposed retractable punch by the two halves of a rotating die 186 operating around a common center. During the rotation, a small amount of glue is applied to the flanges 182 to hold the two halves of the tube 146 around the punch. The thus-supported and joined-together halves of the tube 146 pass on the punch 184 into an apparatus 188 which mechanically sizes the tube 146 around the punch 184 and either seam welds the edges in a permanent manner, such as by radio frequency, or completes the gluing operation, as by supplementary spraying, pressing, etc., thereon. Each sealed-together tube 146 passes downstream, is rotated ¼ turn and then is mechanically pressed in a die set 190 to cause the flanges 182 to become flush with the outside diameter of the tube 146. Excess flange material can also be trimmed off the tube 146 before the described pressing.

As the completed tube 146 passes downstream, the closed front end 152 is cut into the desired number of segments 156 by one or a plurality of cutter blades 192, one of which is shown in FIG. 16. The tube 146 on the punch 184 then passes to a point at which it is contacted with a heated die 194 which melts and compresses only the rear end of the tube to form the integral finger grip 164. The die 194 is then removed, after which the punch 184 is retracted and the finished tube 146 is recovered.

Figure 17:
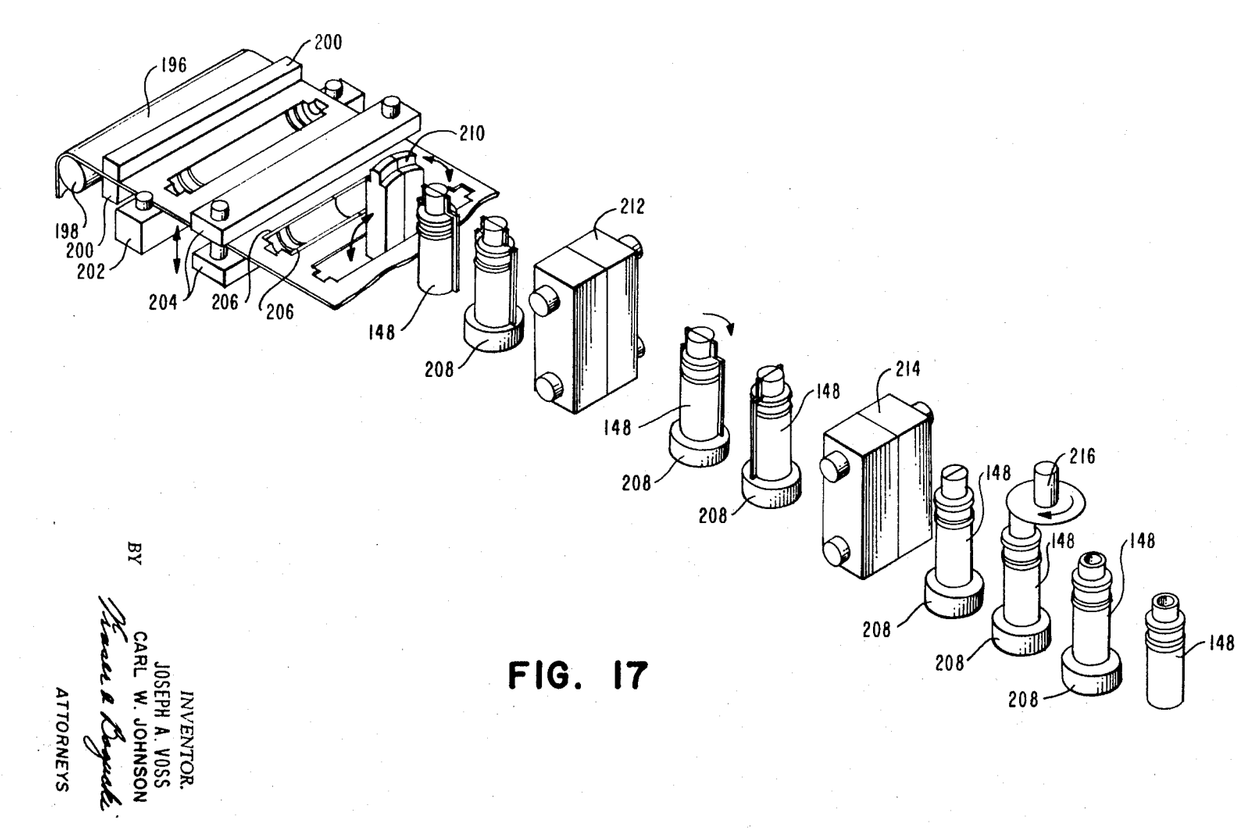
FIGURE 17 is a schematic perspective view of a processing sequence in the fabrication of the inner tube of the device of FIG. 13.

FIG. 17 schematically illustrates a typical processing seqence similar to the sequence illustrated in FIG. 16, but adapted for the fabrication of the inner tube 148 of the device 140 of FIG. 13. In this regard, a sheet 196 of foamed polystyrene of the previously described thickness passes over a roller 198 and between a pair of radiant heaters 200, also as previously described, and thence to a vacuum-forming unit 202 wherein simultaneously both halves of the inner tube are vacuum-formed. The spacer rings 166 and small diameter front end 168 of the tube 148 are also formed simultaneously, after which the inner tube 148 is cut from the sheet by a cutter 204, leaving the small flange 206 on each side thereof, and is transversely cut to separate the two halves. The halves of the tube 148 are then removed from the sheet 196 and immediately rotated into position around a retractable punch 208 by two halves of a die 210. The die may also lightly weld the two halves of the tube 148 at the flanges thereof, or may apply liquid sealant thereto before joining the flanges. The tube 148 is then passed, while still on the punch 208, into a press which mechanically sizes the tube 148 around the punch 208 and effects permanent joining of the two halves of tube 148, as by welding, spraying with sealant and pressing, etc. The tube 148 is then passed into a die set 214 wherein the flanges 206 are pressed into the exterior of the tube 148, with or without prior trimming of the flanges. The tube 148 is then passed under a rotary cutter 216 which opens up the reduced diameter front end 168 of tube 148. Then the retractable punch 208 is removed from the finished tube 148.

The finished tubes 146 and 148 are assembled with the tampon 150 and drawstring 170 in the previously described manner to provide the finished device 140 of FIG. 13.

The device 140 opens readily during expulsion of the tampon 150 therefrom and also has the advantage of having an absolutely smooth exterior surface in the front end 152, including the dome-shaped nose 154 which materially facilitates insertion, delivery of the tampon or other hygienic medium and withdrawal of the device from the body cavity. Moreover, the device can be fabricated rapidly from inexpensive materials, as described. In addition, if the outer tube 146 and the inner tube 148 are fabricated of joined together halves or quarters, or are otherwise appartitioned or sectioned. and if the joining medium is a water-soluble or water-loosenable compound, such as methyl cellulose in alcohol or water-soluble glue or the like, the device 140 is more readily disposable after use. Thus, it can be flushed down a toilet very readily and without danger of clogging the same. The device 140 also is relatively slim, modern and attractive in appearance, particularly when fabricated of an attractive plastic such as polystyrene.

Figure 18:
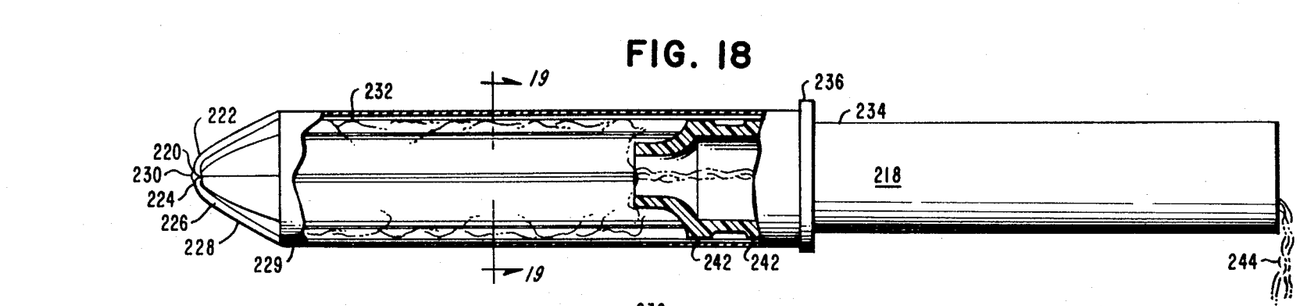
FIGURE 18 is an enlarged schematic side elevation of a further hygienic device in accordance with the invention, portions being broken away to illustrate the internal construction thereof.
Figure 19:
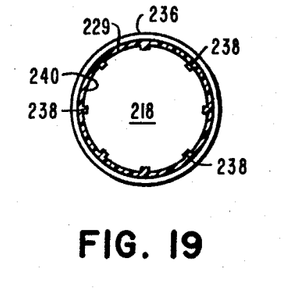
FIGURE 19 is an enlarged schematic cross-section of the outer tube of FIG. 18 taken along the section line 19—19 of FIG. 18.

A modification of the device 140 is schematically illustrated in FIGS. 18 and 19. Thus, in FIG. 18, a hygienic device 218 is schematically shown in side elevation, with portions broken away to illustrate the internal construction thereof. The device 218 is substantially identical to the device 140, except for a dimple 220 centrally located in the exterior surface of the nose 222 at about the point of the closest approximation of the apices 224 of the segments 226 of the front end 228 of outer tube 229. The dimple 220 acts as a reservoir for a small amount of a liquid sealant 230 which is placed in the dimple and allowed to set so as to releasably maintain the apices 224 in close approximation to one another before use. However, the sealant 230 does not materially increase the force required to open the front end 228 during expulsion of the tampon 232 therefrom by the inner tube 234. The device illustrated in FIG. 18 also includes a finger grip 236 at the rear end of tube 229 and, as shown more particularly in FIG. 19, a plurality of longitudinally extending, generally parallel reinforcing ribs 238 integral with and projecting inwardly from the interior surface 240 of the outer tube 229. The ribs 238 act to reinforce the outer tube 229 and to allow a thinner thermoplastic or other material to be used for the outer tube 229. The longitudinal ribs 238 also provide point contact sliding surfaces with spacer rings 242 of the inner tube 234 to facilitate telescoping of the inner tube 234 in the outer tube 229 during use of the device 218. The tampon 232 includes a drawstring 244 extending rearwardly through the tube 234 and out the back end of the device 218. The device of FIG. 18 can be fabricated in any suitable manner according to the present method, including the manners described in connection with the hygenic device 140 illustrated in FIGS. 13–17, inclusive.

Accordingly, improved hygienic devices of the invention and applicators therefor are provided in an inexpensive, simple manner by the present method. Such devices are capable of being used efficiently as catamenial devices, suppository devices and the like and are readily disposable. They minimize the force necessary to deliver hygienic media therefrom and facilitate the insertion in and withdrawal of the devices from body cavities. For such purposes, the improved devices include smooth surfaced, tapered and segmented front ends which open readily during expulsion of hygienic media therefrom. Other advantages of the devices, applicators thereof and method of making the same are set forth in the foregoing.

Although particular hygienic devices and particular methods have been described to illustrate various manners in which the devices of the invention can be fabricated in accordance with the present method, and utilized

What is claimed is:

1. A hygienic applicator comprising, in combination, a tubular member having a normally generally closed, forwardly tapering front end and adapted to contain a hygienic medium, and means releasably disposed within the tubular member and adapted to eject a hygienic medium from said front end, said front end comprising a plurality of independent, self-supporting segments, each of the segments having a smooth, essentially uninterrupted exterior surface, the plurality of segments being disposed uniformly about said front end, the edges of adjacent segments being in close approximation with each other along a major portion of the length of the front end, whereby the exterior surface of the front end is essentially smooth and continuous, the segments being adapted to separate readily in a radial direction during ejection of a hygienic medium from said front end by the ejection means.

2. A catamenial applicator comprising, in combination, a first tubular member including a normally generally closed, forwardly tapering front end adapted to contain a catamenial tampon, and a second tubular member releasably disposed in telescoping relation within the first tubular member and adapted to eject a catamenial tampon from said front end, said front end comprising a plurality of resilient, synthetic thermoplastic segments, said segments being independent and self-supporting and forming a generally dome-shaped nose in said front end, each of said segments having a smooth, essentially uninterrupted exterior surface, said segments being disposed uniformly about said front end with the bases thereof being defined by at least one circumferential groove, whereby the flexibility of said segments is increased and stabilized, the edges of adjacent segments being in close approximation along substantially the entire length thereof, whereby the exterior surface of the front end is essentially smooth and continuous, the segments being adapted to separate readily in a radial direction during ejection of a catamenial tampon from said front end by said second tubular member.

3. The catamenial applicator of claim 2 wherein said first tubular member includes, adjacent the rear end thereof, an integral finger grip which extends outwardly from the exterior surface and inwardly from the interior surface of said first tubular member, wherein said second tubular member includes a tapered front end and a plurality of spaced integral spacer rings rearward of said tapered front end and extending from the exterior surface of said second tubular member, wherein said second tubular member is releasably locked within said first tubular member by said finger grip and at least one of said spacer rings, and wherein said circumferential groove is disposed in the interior surface of said front end.

4. The catamenial applicator of claim 3 wherein each of said first and second tubular members comprises molded, resilient foam polystyrene thermoplastic, wherein said nose includes a centrally positioned dimple and wherein said segments are releasably secured together at said dimple.

5. The catamenial applicator of claim 2 wherein said first tubular member includes a plurality of spaced longitudinally extending stiffening elements integral with and extending inwardly from the interior surface thereof.

6. A hygienic applicator comprising, in combination, a tubular member including a generally steeple-shaped, normally closed front end adapted to contain a hygienic medium and means releasably disposed within said tubular member adapted to eject a hygienic medium from said front end, said front end comprising a plurality of independent, self-supporting, generally triangular forwardly extending segments disposed substantially uniformly about said front end, the apices of said segments approximating each other at about the midline of said front end, each of said segments having an essentially smooth, uninterrupted exterior surface with the edges of adjacent segments abutting along a major portion of the length thereof whereby said front end has an essentially smooth continuous exterior surface, said segments being adapted to separate readily in a radial direction during ejection of a hygienic medium from said front end by said ejection means.

7. The hygienic applicator of claim 6 wherein said applicator comprises a catamenial applicator adapted to contain a catamenial tampon, wherein said apices form a point on said front end, wherein said ejection means comprises a second tubular member releasably disposed in telescoping relation within said tubular member which contains said front end.

8. The catamenial applicator of claim 7 wherein said front end comprises resilient, synthetic thermoplastic.

9. A hygienic applicator comprising, in combination, a tubular member including a frusto-conical-shaped, normally closed front end adapted to contain a hygienic medium, and means releasably disposed within said tubular member and adapted to eject a hygienic medium from said front end, said front end comprising a plurality of independent, self-supporting, generally triangular forwardly extending segments disposed substantially uniformly about said front end, the apices of said segments being bent toward the transverse axis of said tubular member and overlapping one another at about the midline of said front end to form a narrow, generally frusto-conical nose in said front end, each of said segments having an essentially smooth, uninterrupted exterior surface, the edges of adjacent segments abutting along a major portion of the length thereof, said segments separating readily in a radial direction during ejection of a hygienic medium from said front end by said ejection means.

10. The hygienic applicator of claim 9 wherein said device is a catamenial applicator adapted to contain a catamenial tampon, wherein said ejection means comprises a second tubular member releasably disposed in telescoping relation within said tubular member which includes said front end, and wherein said apices are indented to form a dimple in said nose and are releasably sealed together.

11. The catamenial applicator of claim 10 wherein said front end comprises resilient, synthetic thermoplastic.

12. A method of making a hygienic applicator, which method comprises forming a tubular member having a tapered closed front end and an opposite open read end, subsequently dividing said front end into a plurality of segments, the edges of adjacent segments closely approximating each other, said segments being readily separable during ejection of a hygienic medium from said front end, and releasably disposing in said tubular member means for ejecting a hygienic medium from said front end.

13. The method of claim 12 wherein said front end includes a dome-shaped nose, wherein said segments are generally triangular shaped, the apices of which approximate each other about the midline of said nose, wherein said apices are releasably maintained in normally close approximation and wherein the edges of adjacent segments are in close approximation along substantially the entire length thereof.

14. The method of claim 13 wherein said tubular member comprises thermoplastic, wherein said forming comprises vacuum forming of a plurality of complementary components of said tubular member which are then joined together, wherein said tubular member has an integral finger grip extending interiorly and exteriorly thereof adjacent the rear end thereof, and wherein a circumferential groove generally parallel with the transverse axis of said tubular member is formed in the interior surface of said tubular member adjacent the rear end of said front end.

15. A method of making an exterior tubular member for a hygienic medium applicator including the steps of:

forming a plurality of substantially identical, generally triangular segments in the forward portions of thermoplastic tube, said segments being uniformly distributed about the periphery of said forward portion and having their apices defining the forward extremity of said tube;

inserting a male die, having a conically-shaped forward portion, into said tube, said conically-shaped forward portion being disposed within the forward portion of said tube;

inserting the forward portions of said male die and tube within a female die having a conical shape substantially conforming to the conical shape of the forward portion of said male die;

forcing the tube and male die into the female die to draw said segments together to form a tapered forward portion on said tube with the edges of adjacent segments abutting along at least a portion of their lengths;

heating said female die to thereby heat the tube to a temperature above the softening point of the thermoplastic but below its melting point; and, chilling said female die to cool the tube and set the tapered configuration.

16. A method, as defined in claim 15, including the steps of:

bending the apices of the segments inwardly after formation of said segments to cause the apices to overlap when the segments are drawn together; and, bonding said overlapping apices.

17. A method, as defined in claim 16, in which: said bonding is accomplished by cold welding.

References Cited

UNITED STATES PATENTS

| 3,148,680 | 9/1964 | Roberts et al. | 128—263 |
| 3,204,635 | 9/1965 | Voss et al. | 128—263 |
| 3,347,234 | 10/1967 | Voss | 128—263 |

ADELE M. EAGER, *Primary Examiner.*

U.S. Cl. X.R.

128—270

UNITED STATES PATENT OFFICE
CERTIFICATE OF CORRECTION

Patent No. 3,433,225                                   March 18, 1969

Joseph A. Voss et al.

It is certified that error appears in the above identified patent and that said Letters Patent are hereby corrected as shown below:

Column 6, line 64, after "stainless" insert -- steel --. Column 12, lines 25 and 26, cancel "cellulose outer tube can also be formed from a suitable cellulosic" and insert -- cellulosic pulp material by a conventional paper making procedure, --.

Signed and sealed this 14th day of April 1970.

(SEAL)
Attest:

Edward M. Fletcher, Jr.                    WILLIAM E. SCHUYLER, JR.
Attesting Officer                              Commissioner of Patents